US011113221B2

(12) United States Patent
Hsieh

(10) Patent No.: US 11,113,221 B2
(45) Date of Patent: Sep. 7, 2021

(54) MODE SWITCHING SYSTEM AND MODE SWITCHING METHOD USING THE SAME

(71) Applicant: Qisda Corporation, Taoyuan (TW)

(72) Inventor: Sheng-Hsiang Hsieh, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/857,287

(22) Filed: Apr. 24, 2020

(65) Prior Publication Data

US 2020/0379934 A1 Dec. 3, 2020

(30) Foreign Application Priority Data

May 31, 2019 (TW) .................................. 108118998

(51) Int. Cl.
*G06F 13/38* (2006.01)
*G06F 13/42* (2006.01)
*G06F 13/40* (2006.01)

(52) U.S. Cl.
CPC ........ *G06F 13/387* (2013.01); *G06F 13/4072* (2013.01); *G06F 13/4282* (2013.01); *G06F 2213/0042* (2013.01); *G06F 2213/3812* (2013.01)

(58) Field of Classification Search
CPC . G06F 13/387; G06F 13/4072; G06F 13/4282
USPC .......................................... 710/14, 302, 304
See application file for complete search history.

(56) References Cited

U.S. PATENT DOCUMENTS

| | | | |
|---|---|---|---|
| 6,735,720 B1 * | 5/2004 | Dunn | G06F 11/0745 714/43 |
| 2003/0155420 A1 * | 8/2003 | Morrow | G06K 7/10297 235/449 |
| 2004/0205273 A1 * | 10/2004 | Mowery | G06F 9/4411 710/301 |
| 2008/0008172 A1 * | 1/2008 | Kobayashi | G09G 5/006 370/389 |
| 2013/0304942 A1 * | 11/2013 | Golembeski | G06F 13/385 710/14 |
| 2014/0208134 A1 * | 7/2014 | Waters | G06F 13/4282 713/310 |

(Continued)

FOREIGN PATENT DOCUMENTS

| | | |
|---|---|---|
| CN | 107402893 A | 11/2017 |
| CN | 109286764 A | 1/2019 |
| TW | 201614417 A | 4/2016 |

OTHER PUBLICATIONS

Office action of counterpart application by Taiwan IP Office dated May 22, 2020.

*Primary Examiner* — Paul R. Myers

(57) ABSTRACT

A mode switching system including a first electronic device and the second electronic device is provided. The first electronic device includes a main control unit, a USB Type-C interface controller and a USB hub. The interface controller is coupled to the main control unit. The USB hub is coupled to the interface controller. The second electronic device is coupled to the interface controller of the first electronic device. The main control unit is configured to: (1) disable the USB hub in response to a mode switching instruction; (2) switch the mode of the interface controller from a first mode to a second mode; (3) command the interface controller to re-communicate with the second electronic device.

20 Claims, 3 Drawing Sheets

(56) References Cited

U.S. PATENT DOCUMENTS

| | | | |
|---|---|---|---|
| 2016/0117268 A1* | 4/2016 | Griffin | G06F 13/102 710/10 |
| 2016/0191313 A1* | 6/2016 | Chen | H04L 41/0816 370/315 |
| 2016/0378704 A1* | 12/2016 | Adamson | G06F 13/385 710/104 |
| 2018/0210744 A1* | 7/2018 | Shih | G06F 9/45504 |
| 2019/0042503 A1* | 2/2019 | Montero | G06F 13/4282 |
| 2019/0089706 A1* | 3/2019 | Rose | G06F 21/44 |

* cited by examiner

MODE SWITCHING SYSTEM AND MODE SWITCHING METHOD USING THE SAME

This application claims the benefit of Taiwan application Serial No. 108118998, filed May 31, 2019, the subject matter of which is incorporated herein by reference.

BACKGROUND OF THE INVENTION

Field of the Invention

The invention relates in general to a mode switching system and the mode switching method using the same, and more particularly to a USB Type-C mode switching system and the mode switching method using the same.

Description of the Related Art

When the first electronic device is coupled to the second electronic device, the second electronic device must first of all identify the USB hub of the first electronic device before the second electronic device can communicate with the first electronic device. However, it cannot be guaranteed that the second electronic device can successfully (or correctly) identify the USB hub of the first electronic device under all circumstances. Therefore, it has become a prominent task for the industries to provide a method capable of enhancing the success rate of identifying the USB hub of the first electronic device by the second electronic device.

SUMMARY OF THE INVENTION

The invention is directed to a mode switching system and a mode switching method using the same for resolving the above problems.

According to one embodiment of the present invention, a mode switching system is provided. The mode switching system includes a first electronic device and a second electronic device. The first electronic device includes a main control unit, a USB Type-C interface controller and a USB hub. The interface controller is coupled to the main control unit. The USB hub is coupled to the interface controller. The second electronic device is coupled to the interface controller of the first electronic device. The main control unit is configured to: disable the USB hub in response to a mode switching instruction; switch the mode of the interface controller from a first mode to a second mode according to the mode switching instruction; and, command the interface controller to re-communicate with the second electronic device.

According to another embodiment of the present invention, a mode switching method is provided. The mode switching method includes the following steps. The mode switching method is applicable to a first electronic device, which includes a main control unit, a USB Type-C interface controller and a USB hub. The mode switching method includes: coupling a second electronic device to the first electronic device, wherein the second electronic device is electrically coupled to the USB Type-C interface controller; providing a mode switching instruction; disabling the USB hub in response to the mode switching instruction; switching the mode of the interface controller from a first mode to a second mode according to the mode switching instruction; and, commanding the interface controller to re-communicate with the second electronic device.

The above and other aspects of the invention will become better understood with regard to the following detailed description of the preferred but non-limiting embodiment(s). The following description is made with reference to the accompanying drawings.

DETAILED DESCRIPTION OF THE INVENTION

For the object, technical features and advantages of the present invention to be more easily understood by anyone ordinary skilled in the technology field, a number of exemplary embodiments are disclosed below with detailed descriptions and accompanying drawings.

Figure 1A:
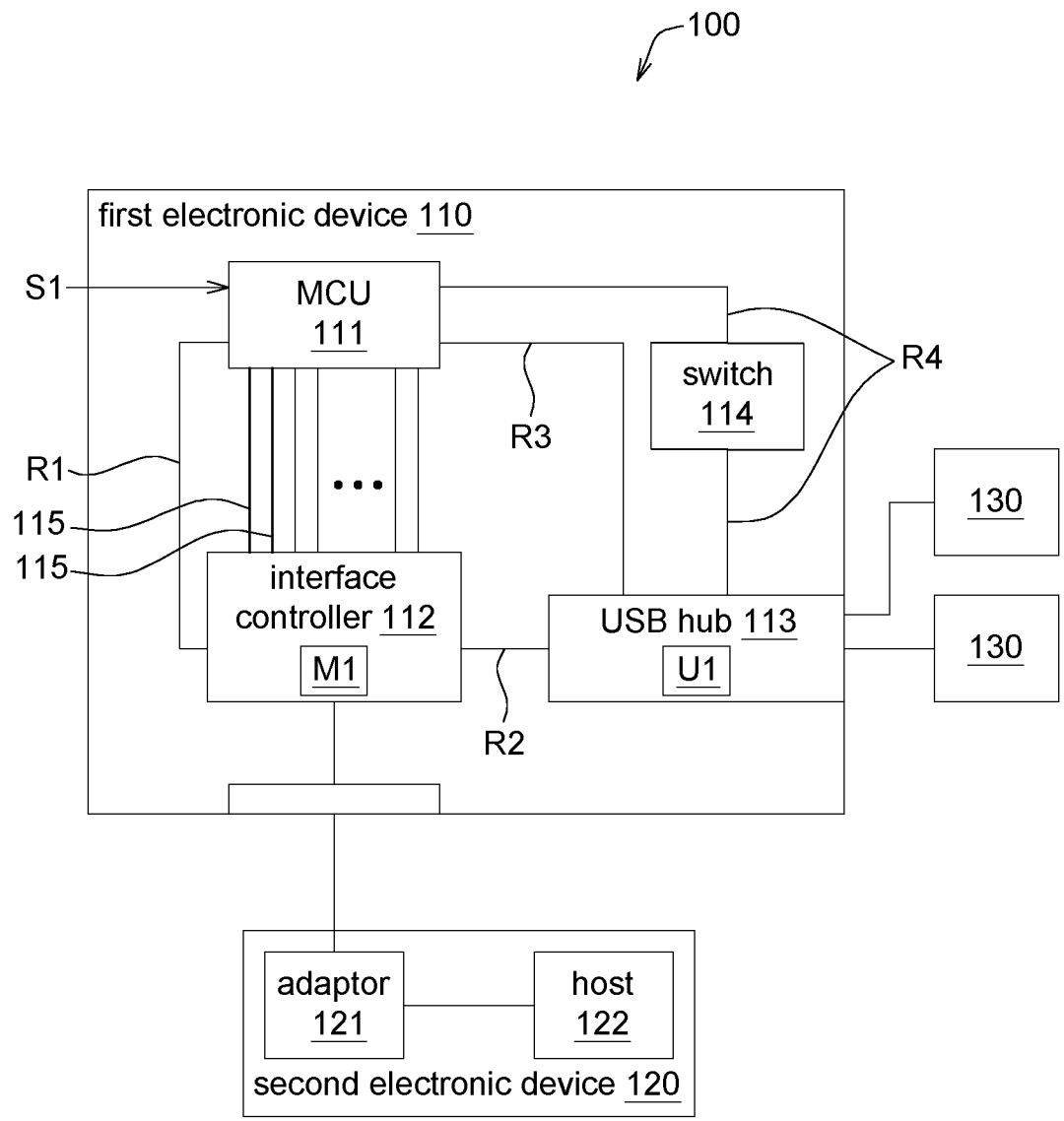
FIG. 1A is a schematic diagram of an interface controller of a mode switching system at a first mode according to an embodiment of the invention.
Figure 1B:
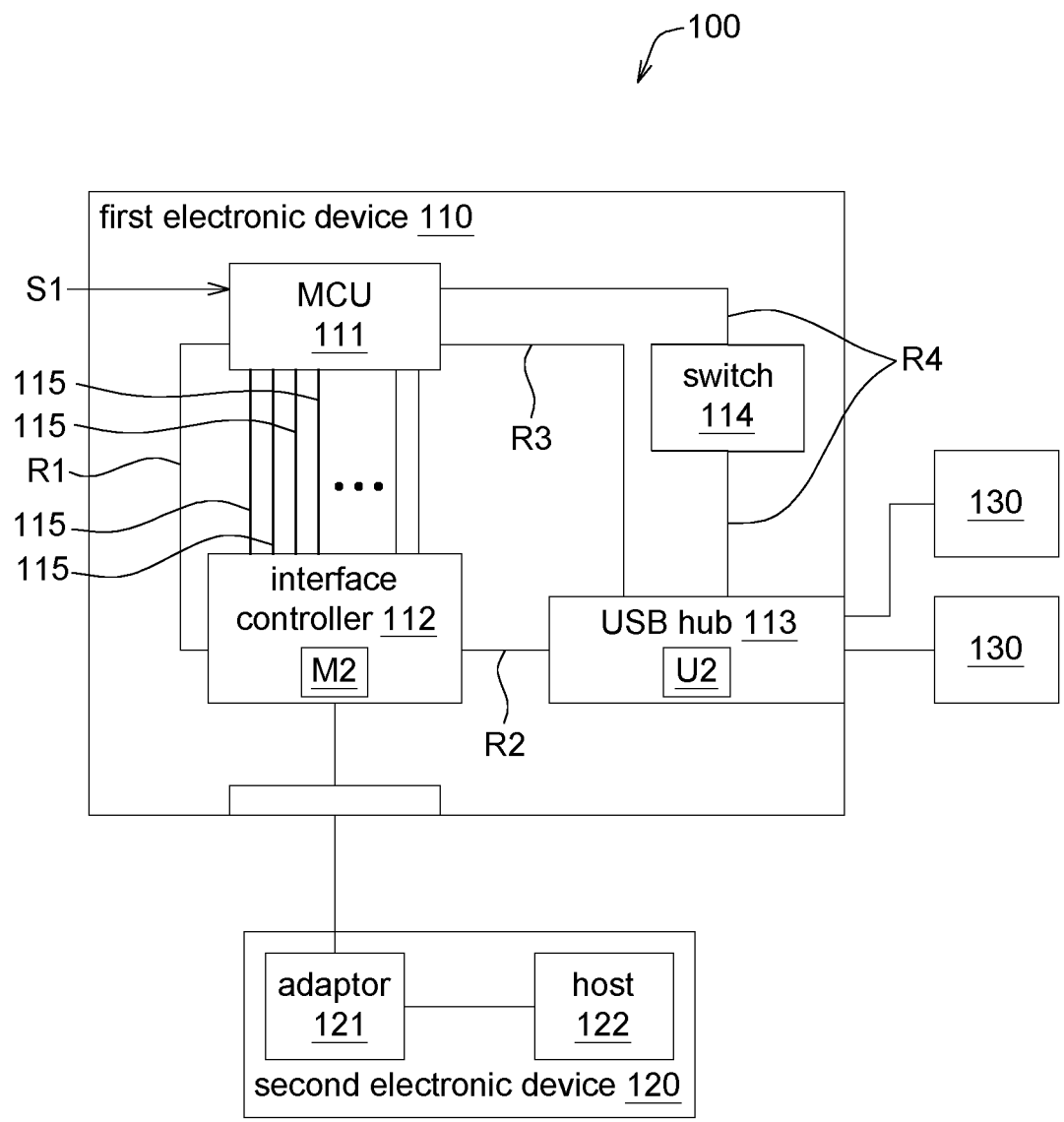
FIG. 1B is a schematic diagram of an interface controller of a mode switching system at a second mode according to an embodiment of the invention.
Figure 2:
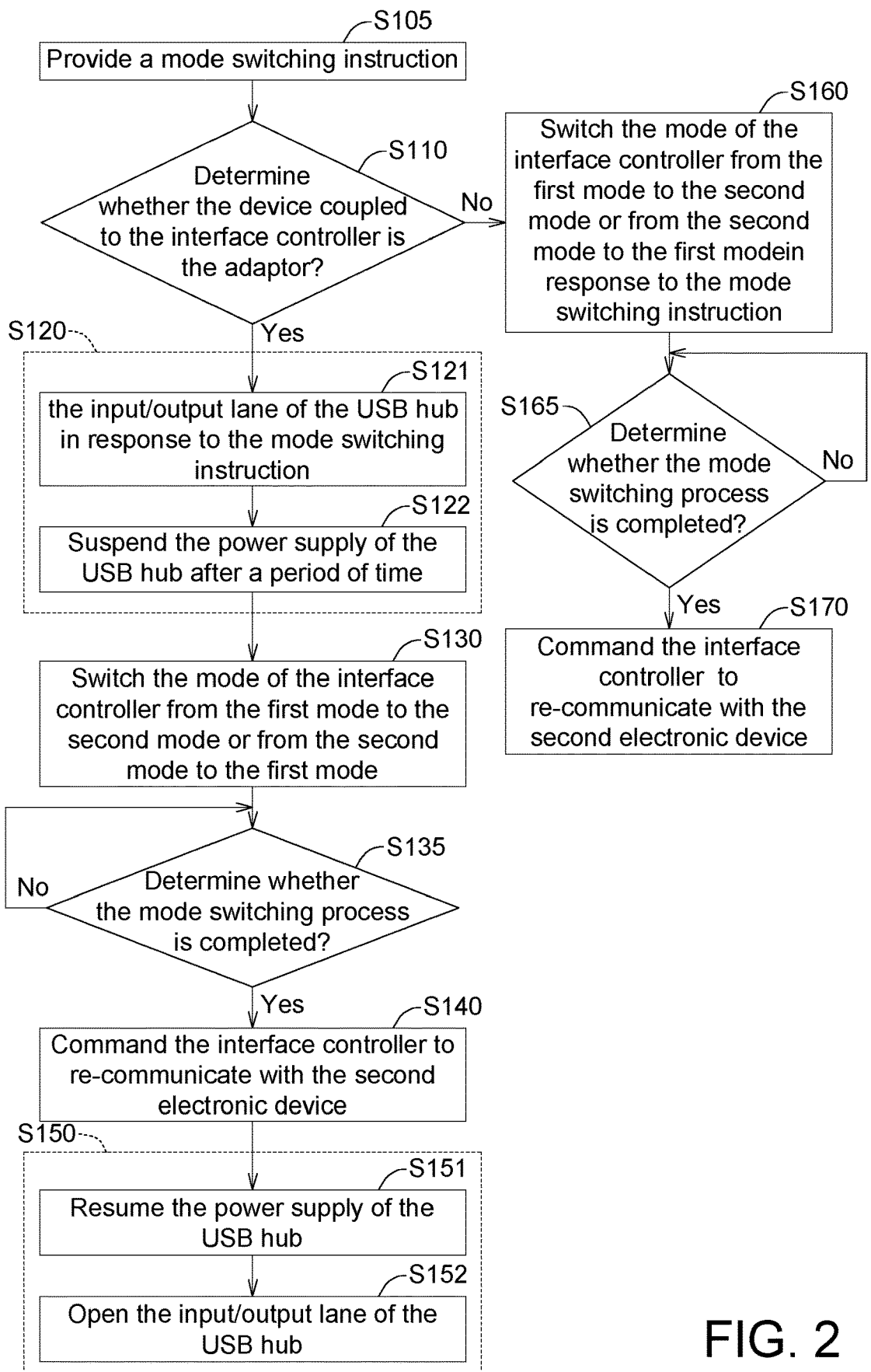
FIG. 2 is a flowchart of a mode switching method of the mode switching system of FIG. 1A.

Refer to FIGS. 1A, 1B and 2. FIG. 1A is a schematic diagram of an interface controller 112 of a mode switching system 100 at a first mode according to an embodiment of the invention. FIG. 1B is a schematic diagram of an interface controller 112 of a mode switching system 100 at a second mode according to an embodiment of the invention. FIG. 2 is a flowchart of a mode switching method of the mode switching system 100 of FIG. 1A.

The mode switching system 100 includes a first electronic device 110, a second electronic device 120 and at least one third electronic device 130 (optional). The first electronic device 110 includes a main control unit (MCU) 111, a universal serial bus (USB) Type-C interface controller 112, a USB hub 113, a switch 114, plural USB Type-C data transmission lanes 115 and plural signal lines R1~R4. The interface controller 112 can be realized by such as a power deliver (PD) controller.

The main control unit 111, the interface controller 112, the USB hub 113 and the switch 114 are disposed on a circuit board (not illustrated). The main control unit 111, the interface controller 112, the USB hub 113 and the switch 114 can be formed of circuit structures, such as chips or semiconductor packages, formed by a semiconductor manufacturing process. The data transmission lanes 115 and the signal lines R1~R4 can be formed on a circuit board by a semiconductor manufacturing process. The data transmission lanes 115 are coupled to the lanes formed of the Type-C data transmission pins (Tx) or data reception pins (Rx). To comply with the USB Type-C specification, the quantity of data transmission lanes 115 is 4.

As indicated in FIG. 1A, the interface controller 112 is coupled to the main control unit 111 through the signal line R1. The USB hub 113 is coupled to the interface controller 112 through the signal line R2. The main control unit 111 is coupled to the USB hub 113 through the signal line R3. The signal line R4 couples the main control unit 111 and the USB hub 113, wherein the switch 114 is disposed on the signal line R4 through which the main control unit 111 can turn on or turn off the input/output function of the USB hub 113.

In an embodiment, the signal lines R1 and R3 can be realized by inter-integrated circuit bus (I2C) signal lines; the signal line R2 can be realized by a USB transmission line; and the signal line R4 can be realized by a general-purpose input/output (GPIO) transmission line.

When the second electronic device 120 is coupled to the interface controller 112 of the first electronic device 110, the identification data of the second electronic device 120 can be transmitted to the first electronic device 110. The second electronic device 120 can include a host 122 only, or can include an adaptor (such as DOCK) 121 and a host 122 as in an embodiment of the invention. The host 122 is coupled to the first electronic device 110 through the adaptor 121. The first electronic device 110 can read the identification data from the second electronic device 120 to identify whether the interface controller 112 is coupled to the host 122 directly or through the adaptor 121. The host 122 can transmit data to the interface controller 112 through the adaptor 121. In an embodiment, the host 122 supports USB Type-C and other transmission specifications such as high definition multimedia interface (HDMI) or video graphics array (VGA) or does not support USB Type-C. The adaptor 121 supports such as USB Type-C, HDMI, VGA or other transmission specifications, and can convert the signal format of the host 122 (such as USB Type-C, HDMI, VGA or other transmission specifications) into USB Type-C, and then output the USB Type-C signals to the interface controller 112. In another embodiment, the second electronic device 120 does not include the adaptor 121, and the host 122 is directly coupled to the first electronic device 110 through a Type-C interface.

The host 122 can be realized by a computer, mobile phone or other types of electronic devices. The first electronic device 110 can be realized by a display with a display panel (not illustrated), and can display the frame data transmitted from the host 122. The third electronic device 130 is coupled to the first electronic device 110. The user can operate the third electronic device 130 to control the function of the first electronic device 110 or the second electronic device 120. The third electronic device 130 can be realized by a mouse, a keyboard or other types of input devices or control devices.

Since the communication between the host 122 and the first electronic device 110 must be through the adaptor 121, when the interface controller 112 switches the mode, the host 122 will not have sufficient response time to identify the USB hub 113 due to the delay of data processing of the adaptor 121, and therefore will be unable to real-time identify the USB hub 113 (for example, the screen of the host 122 displays an exclamation mark). Besides, when the first electronic device 110 or the second electronic device 120 is repeatedly turned on/off for several times, the same problem may occur as well. However, the invention is capable of resolving the above identification problems using the following method.

For example, the main control unit 111 is configured to: disable the USB hub 113 in response to a mode switching instruction S1 (the mode switching instruction S1 is illustrated in FIG. 1A); switch the mode of the interface controller 112 from the first mode M1 to the second mode M2 or from the second mode M2 to the first mode M1 according to the mode switching instruction S1; and, command the interface controller 112 to re-communicate with the second electronic device 120, such that the second electronic device 120 and the interface controller 112 again can communicate and transmit data. To summarize, the above problem of being unable to identify the USB hub 113 can be resolved by firstly disabling the USB hub 113 and then commanding the interface controller 112 to re-communicate with the second electronic device 120. Detailed explanations are disclosed below with the flowchart of FIG. 2.

Firstly, as indicated in FIG. 1A, the second electronic device 120 and the first electronic device 110 are coupled, wherein the second electronic device 120 is electrically coupled to the USB Type-C interface controller 112.

In step S105, a mode switching instruction S1 is provided. For example, the mode switching instruction S1 may come from a user interface (not illustrated). The user interface provides a selection of the first mode M1 and a selection of the second mode M2. The user can select the first mode M1 or the second mode M2 through the user interface, and the user interface will send the mode switching instruction S1 to the main control unit 111 according to the user's selection. The user interface can be provided by the basic input/output system (BIOS) of the first electronic device 110 and can be displayed on the screen of the first electronic device 110. In an embodiment, when the first electronic device 110 and the second electronic device 120 are coupled, the first electronic device 110 automatically pops out the user interface.

In step S110, the identification data is read by the main control unit 111 through the interface controller 112, and whether the device coupled to the interface controller 112 is the adaptor 121 is determined. For example, after the second electronic device 120 and the first electronic device 110 are coupled, the identification data of the second electronic device 120 will be transmitted to the interface controller 112. The identification data may include all identity information of the second electronic device 120, such as the identity information of the adaptor 121 or the identity information of the host 122. The interface controller 112 will store the identification data of the second electronic device 120. The main control unit 111 may obtain the identification data stored by the interface controller 112 through the signal line R1 and determine the type of the device connected to the interface controller 112 according to the identification data. In the present embodiment, the device coupled to the interface controller 112 is exemplified by the adaptor 121 as indicated in FIG. 1A.

If it is determined that the device coupled to the interface controller 112 is the adaptor 121, then the mode switching method proceeds to step S120. If the device coupled to the interface controller 112 is the host 122 instead of the adaptor 121, then the mode switching method proceeds to step S160.

In step S120, the USB hub 113 is disabled by the main control unit 111 through the signal line R1 in response to the mode switching instruction S1. Step S120 can be completed through steps S121 and S122.

In step S121, the input/output lanes of the USB hub 113 is closed by the main control unit 111 through the signal line R4. In an embodiment, the input/output lanes can be realized by general-purpose input/output (GPIO).

The main control unit 111 turns off the switch 114 to close the input/output lanes. After the input/output lanes are closed, no signal input/output transmission will be performed between the USB hub 113 and the main control unit 111 unless the input/output lanes are re-opened. However, since the power supply of the USB hub 113 is still provided by the main control unit 111 (such as through the interface controller 112 and the signal line R2), the signal line R2 between the interface controller 112 and the USB hub 113 allows signal transmission.

In step S122, after a period of time, the power supply of the USB hub 113 is suspended by the main control unit 111 through the signal line R1. The effect of suspending power supply is like unplugging the USB hub 113 off physically. Since the power supply of the USB hub 113 is suspended after a period of time, it can be assured that the transmission of the signal (if any) of the signal line R2 can be completed within a period of time, and the transmission signal (if any) between the interface controller 112 and the USB hub 113 will not be lost. In an embodiment, the period of time is such as 5 seconds, shorter than 5 seconds (such as 2 seconds, 3 seconds or 4 seconds) or longer than 5 seconds (such as 6 seconds or more).

In step S130, the mode of the interface controller 112 is switched from the first mode M1 to the second mode M2 or from the second mode M2 to the first mode M1 by the main control unit 111 through the signal line R1. In the present embodiment, the mode of the interface controller 112 is switched from the first mode M1 of FIG. 1A to the second mode M2 of FIG. 1B by the main control unit 111. Specifically, the value of the register inside the interface controller 112 can be adjusted by the main control unit 111 through the signal line R1 to change the mode of the interface controller 112.

In an embodiment, the first mode M1 represents that the quantity of opened data transmission lanes 115 is one of 2 and 4, and the second mode M2 represents that the quantity of opened data transmission lanes 115 is the other one of 2 and 4. In the present embodiment, the first mode M1 is exemplified by the scenario that the quantity of opened data transmission lanes 115 is 2 (referred as "the first quantity" illustrated by 2 bold lines of FIG. 1A), and the second mode M2 is exemplified by the scenario that the quantity of opened data transmission lanes 115 is 4 (referred as "the second quantity" illustrated by 4 bold lines of FIG. 1B) In another embodiment, the first quantity can be 4, and the second quantity can be 2.

In the present embodiment, when the mode of the interface controller 112 is the first mode M1, 2 data transmission lanes 115 are opened, and the USB hub 113 supports the frame data with FHD resolution (1920×1080, 1080p), and the USB hub 113 supports USB 2.0 with a lower transmission speed. When the mode of the interface controller 112 is the second mode M2, 4 data transmission lanes 115 are opened, and the USB hub 113 supports the frame data with 4K resolution, and the USB hub 113 supports USB 3.0 with a higher transmission speed.

In step S130, the mode of the USB hub 113 is switched from one of the first USB mode U1 and the second USB mode U2 to the other one of the first USB mode U1 and the second USB mode U2 by the main control unit 111 through the signal line R3, wherein the first USB mode U1 corresponds to the first mode M1, and the second USB mode U2 corresponds to the second mode M2. In the present embodiment, the mode of the interface controller 112 is switched from the first mode M1 of FIG. 1A to the second mode M2, therefore the mode of the USB hub 113 is switched from the first USB mode U1 of FIG. 1A to the second USB mode U2 of FIG. 1B.

In step S135, whether the mode switching process is completed is determined by the main control unit 111. For example, the main control unit 111 determines whether the content of the register of the interface controller 112 has been correspondingly switched to the value of the switched mode. If the determination in step S135 is affirmative, then the mode switching method proceeds to step S140. If the determination is negative, then the mode switching method returns to step S135, and waits for the mode switching process to be completed.

In step S140, the interface controller 112 is commanded by the main control unit 111 to re-communicate with the second electronic device 120. Since the mode of the interface controller 112 has changed, the main control unit 111 commands the interface controller 112 to re-communicate with and inform the second electronic device 120 that the mode of the first electronic device 110 has been switched to the second mode M2.

In step S150, after the interface controller 112 is commanded to re-communicate with the second electronic device 120, the USB hub 113 is enabled by the main control unit 111. Step S150 can be implemented through steps S151 and S152.

In step S151, the power supply of the USB hub 113 is resumed by the main control unit 111.

In step S152, the input/output lanes of the USB hub 113 is opened by the main control unit 111 through the signal line R4. In an embodiment, the main control unit 111 can turn on the switch 114 to open the input/output lanes of the USB hub 113.

After the power supply of the USB hub 113 is resumed and the input/output lanes of the USB hub 113 is opened, the USB hub 113 resumes normal operation. For example, normal communication between the main control unit 111 and the USB hub 113 is resumed, and normal communication between the interface controller 112 and the USB hub 113 is also resumed.

In step S110, if the device coupled to the interface controller 112 is not the adaptor 121 (for example, the device coupled to the interface controller 112 is the host 122), the mode switching method proceeds to step S160.

In step S160, the mode of the interface controller 112 is switched from the first mode M1 to the second mode M2 or from the second mode M2 to the first mode M1 by the main control unit 111 in response to the mode switching instruction S1. In the present embodiment, the mode of the interface controller 112 is switched from the first mode M1 of FIG. 1A to the second mode M2 of FIG. 1B by the main control unit 111.

Since the device coupled to the interface controller 112 is not the adaptor 121 (for example, the host 122 is directly coupled to the interface controller 112), the host 122 normally can identify the USB hub 113 of the first electronic device 110. Under such circumstances, as indicated in FIG. 2, the main control unit 111 does not perform step S120, but directly switches the mode of the interface controller 112 from the first mode M1 of FIG. 1A to the second mode M2 of FIG. 1B (step S160). In another embodiment, step S160 can be replaced by steps S120 and S130, and step S150 is performed in the wake of step S171.

In step S165, whether the mode switching process is completed is determined by the main control unit 111. If the determination is affirmative, then the mode switching method proceeds to step S170; if the determination is negative, then the mode switching method returns to step S165, and waits for the mode switching process to be completed.

In step S170, the interface controller 112 is commanded by the main control unit 111 to re-communicate with the second electronic device 120. Since the mode of the interface controller 112 has been changed, the main control unit 111 commands the interface controller 112 to re-communicate with and inform the second electronic device 120 that the mode of the first electronic device 110 has been switched to the second mode M2.

In the above embodiments, the mode switching process is exemplified by the switching from the first mode M1 to the second mode M2. In another embodiment, the mode switching method for switching the second mode M2 to the first mode M1 can be obtained by the same analogy, and the similarities are not repeated here.

To summarize, even when the first electronic device and the second electronic device are indirectly coupled (such as through an adaptor), during the mode switching process, the mode switching system of the invention still can enable the second electronic device to identify the USB hub of the first electronic device within a response time predetermined by the system.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A mode switching system, comprising:
   a first electronic device, comprising:
   a main control unit;
   a universal serial bus (USB) Type-C interface controller coupled to the main control unit;
   a USB hub coupled to the interface controller; and
   a second electronic device coupled to the interface controller of the first electronic device;
   wherein the main control unit is configured to:
   disable the USB hub in response to a mode switching instruction;
   switch the mode of the interface controller from a first mode to a second mode; and
   command the interface controller to re-communicate with the second electronic device.

2. The mode switching system according to claim 1, wherein the second electronic device comprises an adaptor and a host, the host is electrically coupled to the interface controller of the first electronic device through the adaptor;
   wherein the main control unit is further configured to:
   determine whether the interface controller coupled to the adaptor or the host; and
   perform the step of disabling the USB hub, the step of switching the mode of the interface controller from the first mode to the second mode and the step of commanding the interface controller to re-communicate with the second electronic device when the interface controller coupled to the adaptor.

3. The mode switching system according to claim 1, wherein the main control unit is further configured to:
   close input/output lanes of the USB hub, and
   suspend the power supply of the USB hub.

4. The mode switching system according to claim 3, wherein the first electronic device further comprises:
   a switch coupled the main control unit and the input/output lanes of the USB hub;
   wherein in the step of closing the input/output lanes of the USB hub, the main control unit is further configured to:
   turn off the switch to close the input/output lanes.

5. The mode switching system according to claim 3, wherein the main control unit is further configured to:
   perform the step of closing the input/output lanes; and
   perform the step of suspending the power supply of the USB hub after a period of time.

6. The mode switching system according to claim 1, wherein the main control unit is further configured to:
   enable the USB hub to be re-connected to the second electronic device after commanding the interface controller to re-communicate with the second electronic device.

7. The mode switching system according to claim 3, wherein the main control unit is further configured to:
   resume the power supply of the USB hub after commanding the interface controller to re-communicate with the second electronic device; and
   open the input/output lanes of the USB hub.

8. The mode switching system according to claim 1, wherein the main control unit is further configured to:
   switch the mode of the USB hub from a first USB mode to a second USB mode in response to the mode switching instruction, wherein the first USB mode corresponds to the first mode, and the second USB mode corresponds to the second mode.

9. The mode switching system according to claim 1, wherein the first electronic device further comprises:
   a plurality of transmission lanes coupled to the main control unit and the interface controller;
   the interface controller is further configured to:
   in the step of switching the mode of the interface controller from the first mode to the second mode, switch the quantity of opened transmission lanes from a first quantity to a second quantity.

10. The mode switching system according to claim 9, wherein the main control unit is further configured to:
    switch the mode of the USB hub from a first USB mode to a second USB mode in response to the mode switching instruction;
    wherein the first USB mode corresponds to the first mode, the second USB mode corresponds to the second mode; the first quantity is 2, the first USB mode is USB 2.0, the second quantity is 4, and the second USB mode is USB 3.0.

11. A mode switching method applicable to a first electronic device, wherein the first electronic device comprises a main control unit, a USB Type-C interface controller and a USB hub, the mode switching method comprising:
    coupling a second electronic device to the first electronic device, wherein the second electronic device is electrically coupled to the USB Type-C the interface controller;
    providing a mode switching instruction;
    disabling the USB hub in response to the mode switching instruction;
    switching the mode of the interface controller from a first mode to a second mode; and
    commanding the interface controller to re-communicate with the second electronic device.

12. The mode switching method according to claim 11, wherein the second electronic device comprises an adaptor and a host, the method further comprising:
    determining, by the main control unit, whether the interface controller couple to the adaptor or the host; and
    performing the step of disabling the USB hub, the step of switching the mode of the interface controller from the first mode to the second mode and the step of commanding the interface controller to re-communicate with the second electronic device when the interface controller coupled to the adaptor.

13. The mode switching method according to claim 11, further comprising:
    closing input/output lanes of the USB hub by the main control unit, and
    suspending the power supply of the USB hub by the main control unit.

14. The mode switching method according to claim 13, wherein the first electronic device further comprises a switch, and in the step of the coupling the main control unit to the USB hub by switch, the method further comprising:

turning off the switch by the main control unit to close the input/output lanes.

15. The mode switching method according to claim 13, further comprising:

performing the step of closing the input/output lanes by the main control unit; and suspending the power supply of the USB hub by the main control unit after a period of time.

16. The mode switching method according to claim 11, further comprising:

enabling the USB hub by the main control unit after commanding the interface controller to re-communicate with the second electronic device.

17. The mode switching method according to claim 13, further comprising:

resuming the power supply of the USB hub by the main control unit after commanding the interface controller to re-communicate with the second electronic device; and opening the input/output lanes of the USB hub.

18. The mode switching method according to claim 11, further comprising:

switching the mode of the USB hub from a first USB mode to a second USB mode by the main control unit in response to the mode switching instruction, wherein the first USB mode corresponds to the first mode, and the second USB mode corresponds to the second mode.

19. The mode switching method according to claim 11, wherein the first electronic device further comprises a plurality of transmission lanes coupled to the main control unit and the interface controller, and the method further comprising:

In the step of switching the first mode to the second mode by the interface controller, switching the quantity of opened transmission lanes from a first quantity to a second quantity.

20. The mode switching method according to claim 19, further comprising:

switching the mode of the USB hub from a first USB mode to a second USB mode by the main control unit in response to the mode switching instruction;

wherein the first USB mode corresponds to the first mode, and the second USB mode corresponds to the second mode; the first quantity is 2, the first USB mode is USB 2.0, the second quantity is 4, and the second USB mode is USB 3.0.

* * * * *